United States Patent
Reinhardt et al.

[11] Patent Number: 6,084,331
[45] Date of Patent: Jul. 4, 2000

[54] DEVICE FOR SUPPORTING AND ELECTRICALLY CONTACTING BRUSHES, PARTICULARLY FOR TURBINE GENERATORS

[75] Inventors: Helmut Reinhardt; Rolf-Günter Bell, both of Mülheim an der ruhr; Michael Brandtner, Leichlingen; Erwin Müller, Essen; Klaus Preissner, Mülheim an der ruhr; Herbert Rohrer, Wachtendonk; Fred Zimmermann, Essen, all of Germany

[73] Assignee: Siemens Aktiengesellschaft, Munich, Germany

[21] Appl. No.: 09/289,704

[22] Filed: Apr. 12, 1999

Related U.S. Application Data

[63] Continuation of application No. PCT/DE97/02327, Oct. 10, 1997.

[51] Int. Cl.[7] ............................................... H02K 5/00
[52] U.S. Cl. ........................................ 310/91; 310/239
[58] Field of Search .......................... 310/91, 238, 239, 310/240, 245

[56] References Cited

U.S. PATENT DOCUMENTS

| | | | |
|---|---|---|---|
| 1,582,712 | 4/1926 | Wagner | 310/239 |
| 2,426,815 | 9/1947 | Burrus | 310/239 |
| 3,387,155 | 6/1968 | Krulls | 310/239 |
| 4,296,346 | 10/1981 | Ooki et al. | 310/242 |
| 4,355,254 | 10/1982 | Oki et al. | 310/242 |
| 4,950,933 | 8/1990 | Pipkin et al. | 310/239 |
| 5,028,492 | 7/1991 | Guenin | 428/614 |
| 5,268,605 | 12/1993 | Bradfield | 310/71 |
| 5,285,125 | 2/1994 | Lang | 310/240 |

FOREIGN PATENT DOCUMENTS

| | | |
|---|---|---|
| 1537426 | 7/1968 | France . |
| 40 09 851 A1 | 9/1991 | Germany . |
| 94 00 080 | 4/1994 | Germany . |

OTHER PUBLICATIONS

"Brush Change under Tension" (Irresberger), Technische Rundschau, vol. 63, No. 1, Jan. 1971, pp. 26–29.

*Primary Examiner*—Nestor Ramirez
*Assistant Examiner*—Joseph Waks
*Attorney, Agent, or Firm*—Herbert L. Lerner; Laurence A. Greenberg; Werner H. Stemer

[57] ABSTRACT

A device for supporting and electrically contacting brushes, with which an electrical loop contact can be established with slip-rings on a shaft of a current generator or an electric motor. The device includes a support having a support base and a plurality of pins fastened thereto, through which at least one brush can be connected supportively with the support base. The device has at least one current distributor which can be electrically contacted in a short-circuiting manner with at least two brushes and can be connected to at least one electrical connection line. More than one of the pins function as an electrical contact pin with a contact surface and are integral components of at least one current distributor, so that at least one brush can be connected supportively through it and electrically contacted. The supporting base is electrically insulated at least in regions of connecting locations to the contact pins.

19 Claims, 5 Drawing Sheets

DEVICE FOR SUPPORTING AND ELECTRICALLY CONTACTING BRUSHES, PARTICULARLY FOR TURBINE GENERATORS

CROSS-REFERENCE TO RELATED APPLICATION

This application is a continuation of copending International Application No. PCT/DE97/02327, filed Oct. 10, 1997, which designated the United States.

BACKGROUND OF THE INVENTION

FIELD OF THE INVENTION

The invention relates to a device for supporting and electrically contacting brushes, with which an electrical loop contact can be established to slip-rings on a shaft of a current generator. During the operation of generators, an induction current coming from stationary units is transmitted to slip rings of a rotor shaft.

Such devices have been known for a long time and generally function reliably over long periods of times. A device of that type is known from German Utility Model G 94 00 080.8, in which brushes are movable between a working position and a standstill position. In the working position an electrical contact exists between the brushes and the slip-ring, although not in the standstill position. Safe electrical contact in the working position is achieved through the use of mobile parts of the device and a contact pressure.

However, devices of that type with fixed parts for supporting the brushes are also known. That requires a particularly stable construction of the device. In a known structural form, several pins are fixed to a supporting base. The supporting base is made of metal and the pins are made of an insulating material. The pins are disposed around the rotation axis of the shaft. At least one sleeve made of electrically conductive material is pushed over each pin, in order to establish electrical contacting with the brushes. The brushes themselves are held by a holder which can be inserted onto the sleeves or pulled out from them. Generally, exactly two sleeves are pushed over each pin which, due to the insulating effect of the pin and a spacer between the sleeves, helps current transmission to two different slip-rings, that have a different electrical potential during operation of the current generator or the electrical motor. The sleeves for current transmission to the same slip-ring are always components of a current distributor. Part of a current distributor is also formed by a partly ring-shaped current rail, with which the sleeves are short-circuited, and a current connection rail with holes for fixing and connecting an electrical connection line. The connections between the current rails and the connections between the partly ring-shaped current rail and the sleeves are ensured through the use of rivets or screws.

German Published, Non-Prosecuted Patent Application DE 40 09 851 A1 discloses a short-circuiting and brush-lifting mechanism for asynchronous motors with slip-ring rotors, which work wear-free to a large extent and are insensitive to impurities. With the help of a rotatable actuation ring having brush actuation guides, the brushes are only removed when the slip-rings have been short-circuited.

The above-described device is used with a great deal of reliability in continuous operation of electrical machines. It is, however, composed of up to 250 individual parts. Since the assembly generally takes place only at the site of the machine, a relatively high expenditure for storage and assembly of the components is unavoidable.

U.S. Pat. No. 1,582,712 relates to a brush holder for electric machines. Bolts which are disposed on an electrically conductive ring are directed, at equal spacings along the circumference of the ring, parallel to the ring axis. Electric brushes can be connected mechanically and electrically to the bolts. The ring is surrounded, at equal spacings over its circumference, by a number of magnetic elements. In each case two magnetic elements thus enclose a group of bolts. Electric current is fed, through a lead in each case, to each group of bolts. Electric current flowing through the electrically conductive ring from one group of bolts into the other group of bolts is damped as it passes through the group-separating magnetic element since the magnetic element produces a high impedance for that current. As a result of that division of the bolts into groups through the use of the magnetic elements, the current paths to the individual plug-in brushes are essentially identical, and thus the currents through the individual plug-in brushes are likewise essentially identical.

French Patent Application No. 1 537 426 concerns an annular plug-in brush holder for electric machines. That French Patent Application deals exclusively with a ring which connects and secures the plug-in brushes. The object of French Patent Application No. 1 537 426 is to provide increased operational reliability. That is achieved in such a way that the electrically conductive electric connection connecting the plug-in brushes is routed within an insulating ring which includes two mutually opposite ring parts that butt directly against one another. In each case an electric conductor is routed within one annular groove. The respective contact bolts of the plug-in brushes are connected to the electric conductors.

SUMMARY OF THE INVENTION

It is accordingly an object of the invention to provide a device for supporting and electrically contacting brushes, particularly for turbine generators, which overcomes the hereinafore-mentioned disadvantages of the heretofore-known devices of this general type, which can be produced and assembled easily in a cost-effective manner and which at the same time ensures high operational reliability and safety.

With the foregoing and other objects in view there is provided, in accordance with the invention, a device for supporting and electrically contacting brushes and for establishing an electrical loop contact with slip-rings on a shaft of a current generator or an electrical motor, the device comprising a support with a supporting base; a plurality of pins fastened to the supporting base for supportively connecting at least one brush to the supporting base; at least one current distributor to be electrically contacted by short-circuiting with at least two brushes and to be connected to at least one electrical connection line; more than one of the pins being a component part of the at least one current distributor and being an electric contact pin with a contact surface, for supportively connecting and electrically contacting at least one brush; and the supporting base being electrically insulating at least in regions of connecting locations to the contact pins.

The solution offered by the invention as described above combines the functions of "supporting" and "electrical contacting" of the brushes or the holders of the brushes. In this way, the number of components are reduced as compared to the prior art technology, while at the same time the stability and reliability is further enhanced.

According to the invention, more than one of the pins which support the brushes are constructed as an electrical contact pin. With the help of such a contact pin, not only a supporting connection between at least one of the brushes and the supporting base, but also an electrical contact of the brush or brushes to a current distributor, is established. In order to contact the brush or brushes a contact surface of the contact pin is provided, which could be the edge surface of a hole in the contact pin. The contact pin should preferably not have any hole, but should be made of a solid electrically conductive material, preferably steel, so that the outer surfaces of the pin form the contact surfaces. The contact pin is fixed to the supporting base, which is electrically insulated at least in the region of the connections to the contact pins. However, the supporting base could also be made completely of an insulating material. Thus, not more than two different materials need to be used for the contact pin and the supporting base. This possible reduction in the multiplicity of materials used in the prior art technology, opens the gate to a series of advantages in the production of components and in the assembly of the device.

In accordance with another feature of the invention, the contact pins are components of the same current distributor and are connected to one another by a rigid distributor ring. Like a contact pin, the distributor ring also fulfils two different functions: it short-circuits the contact pins with one another and ensures a stable connection. The distributor ring can be made of the same material as the contact pins, preferably steel, in which case the number of materials being used does not increase. With the help of the distributor ring, all of the contact pins of the same current distributor are connected to one another, which provides a particularly stable current distributor.

In accordance with a further feature of the invention, in order to ensure the durability of this connection as well as due to reasons of assembly friendliness, a special construction of the invention provides for securing as many of these connections as possible by welding. The same provision is made for any eventual connections of the contact pins with further components of the current distributors. If the welding processes are carried out carefully, then one can accomplish a reliable mechanical stability and low electrical resistance within the current distributor throughout the entire life span, especially in the case of strong vibrations.

The use of a distributor ring is not restricted only to a device according to the invention. For example, it is also possible to connect sleeves with a distributor ring in devices according to the described prior art technology.

A prerequisite for an efficient functioning of a current generator or an electrical motor is a good electrical contact of the current distributor to the brushes and to at least one electrical connection line. For this reason, in accordance with an added feature of the invention, the current distributor is a performed terminal for fixing at least one electrical connection line and the terminal contact surfaces of the contact pins of the current distributor are tin-plated. Other measures for ensuring a good electrical contact could be the use of corrosion-resistant materials, e.g. high-grade steel, and/or the use of material pairs for connection line-distributor ring or distributor ring-brush holder electron work function.

In accordance with an additional feature of the invention, the supporting wall has a cutout for the shaft with the slip-rings, which provides a simple and at the same time stable construction of the supporting base.

In accordance with yet another feature of the invention, the distributor ring contains contact pins which have longitudinal axes that are aligned parallel to the rotation axis of the shaft. In this way, one can use the same type of brush holders as are used in the prior art technology, which are inserted onto a pin from the outside toward the inside in a direction radial to the rotation axis of the shaft.

In accordance with yet a further feature of the invention, all of the longitudinal axes of the contact pins are located at approximately the same distance to the rotation axes of the shaft. In this way, the same brush holders and brushes can be used for each contact pin. Therefore, while changing the brushes, one need not pay attention to the type of the holders or the type of the brushes.

An assembly-friendly and reliable form of fastening the contact pins to the supporting base is to screw-in the contact pins. Therefore, in accordance with yet an added feature of the invention, the contact pins each have an outer thread on one end which is screwed into a threaded hole of the supporting base. If a rigid distributor ring is subsequently fixed to the other end of the contact pins as described, then this secures the screwed connections. If the distributor ring is welded to the contact pins, then this also provides a connection between the contact pins and the supporting base which cannot become loose through vibrations or oscillations.

In accordance with yet an additional feature of the invention, there are two current distributors, which are insulated from one another in the regions of the connections to the contact pins due to the insulating property of the supporting base. These two current distributors are fastened to two opposite outer sides of the supporting base or to one of several base parts of the supporting base. The outer sides are oriented in two opposite directions of the rotation axis of the shaft. In this way, the electrical contacts can be established to two slip-rings having different electrical potential. The parts of the device which are used are supported by the same supporting base or the same base parts, as described. This single-support-principle has already been realized in the prior art technology. However, both current distributors are located on the same outer side of the support base or the base part. Thus, with the help of the invention, the lever arms formed by the pins can be reduced to half the length. Shorter pins are advantageous, because in this way lesser slight self-oscillations with large oscillation amplitudes can be induced through vibration. in accordance with again another feature of the invention, the configuration of the two current distributors is primarily mirror-symmetrical to the supporting base or a base part, although with the exception of fixing locations of the contact pins which are staggered relative to one another. One advantage is that the same component can be used for both current distributors. The supporting base can also be constructed to be correspondingly thinner by staggering the fixing locations, so that material and space can be saved.

In accordance with again a further feature of the invention, in order to achieve a particularly stable fixing of a current distributor with the contact pins, the current distributor is disposed between two base parts of a divided supporting base, whereby the contact pins are partly fixed to one base part and partly to another base part. Another advantage of this type of construction of the device according to the invention is that even in spite of vibration-resistant construction, significantly long pins can be used and therefore also a significantly larger number of brushes can be supported, which is necessary in the case of some current generators or electric motors.

In accordance with again an added feature of the invention, due to safety reasons, the shaft of the current generator or electric motor is provided with a contact-protection device. The contact-protection hood, which is used for this purpose, is connected to the supporting base and surrounds the shaft and the current distributor on top and on the sides lying horizontally transverse to the rotation axis of the shaft. Such a contact-protection hood is already known from the prior art technology. However, what is new and especially advantageous is a contact-protection hood for the above-described structural variations with two current distributors against two opposite outer sides of the supporting base or the base part. The contact-protection hood is open at both ends in the direction of the rotation axis of the shaft, so that air can horizontally flow below the contact-protection hood, with the result that one can do away with a compulsory ventilation through a blower or other active units.

In accordance with a concomitant feature of the invention, the contact-protection hood has several window-type openings at the top and/or on the sides horizontally transverse to the rotation axis of the shaft, having a size which is dimensioned in such a way that a penetration to the current distributor becomes difficult or impossible. However, a natural convection movement of air through the openings is possible due to heat generation on the brushes.

The contact-protection hood, with or without window-type openings, could be formed of several parts which are joined with one another only by the supporting base.

If a contact-protection hood is suitably constructed with such window-type openings, then one could eventually also do away with active ventilation in the case of devices according to the prior art technology, although the contact-protection hood is possibly closed at both ends in the direction of the rotation axis of the shaft, or the air can flow only at one open end horizontally below the contact-protection hood.

Other features which are considered as characteristic for the invention are set forth in the appended claims.

Although the invention is illustrated and described herein as embodied in a device for supporting and electrically contacting brushes, particularly for turbine generators, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
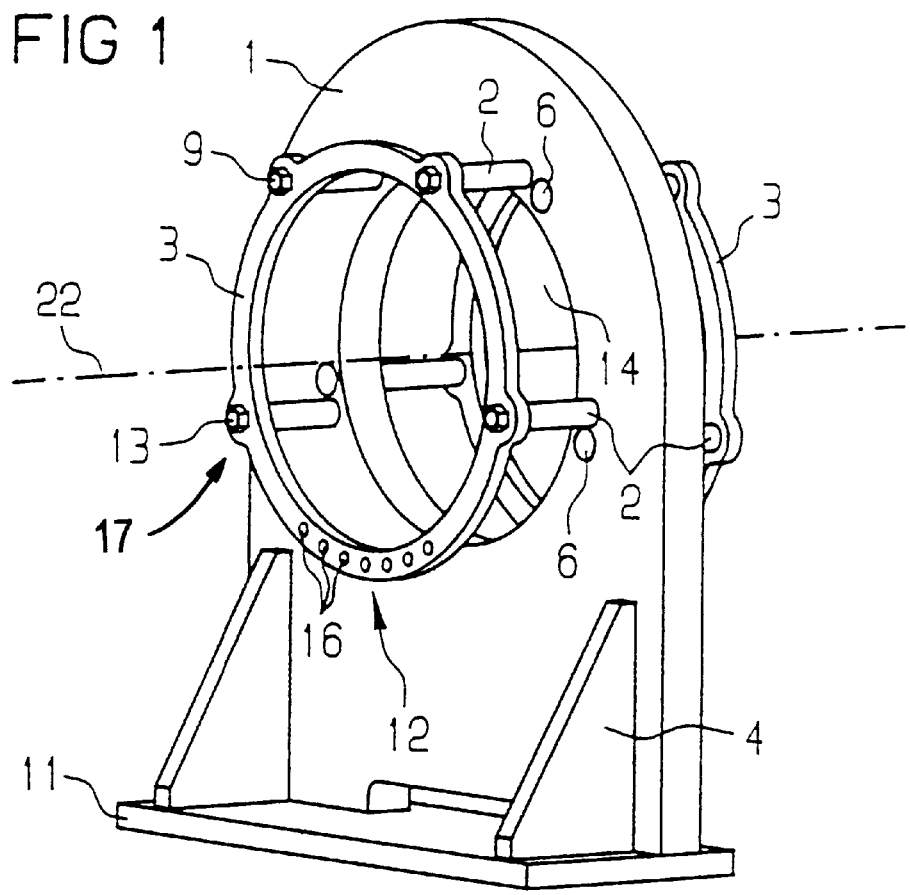
FIG. 1 is a diagrammatic, perspective view of an embodiment example with a supporting wall and two current distributors electrically insulated from one another.

Referring now to the figures of the drawings in detail and first, particularly, to FIG. 1 thereof, there is seen a supporting base 1 with supporting legs 4 and a base plate 11. The base plate 11 could be screwed to the floor in order to ensure a secure and fixed position of the supporting base 1. The supporting base 1 has a supporting wall which is rounded off towards the top in a semicircular manner and which has a nearly circular cutout 14 for a shaft with slip-rings. A rotation axis 22 of the shaft extends perpendicular to both parallel outer surfaces of the supporting wall and penetrates the circular cutout 14 approximately at its center. However, instead of a circular cutout 14, it is also possible to use cutouts having other shapes, in order to save wall material or to aid a natural convection movement of air through the cutout. Current distributors 17 that are disposed on both outer surfaces of the supporting wall each have four contact pins 2 which are fixed to the supporting wall. The fixing positions of the two current distributors 17 do not lie opposite to one another, but instead are staggered against one another. Otherwise, the configuration of the two current distributors 17 is mirror-symmetrical relative to the supporting base 1. A distributor ring 3 is fixed to each current distributor 17 at ends of the contact pins 2 facing away from the supporting base 1. The distributor rings 3 have ring bulges 13 at fixing points. The bottoms of the distributor rings 3 are constructed as connecting terminals 12 with fastening holes 16 for connection to electrical connecting lines.

In the illustrated embodiment example, the supporting wall is formed of one piece and made of an insulating material. However, other structural forms of the supporting base 1 are also possible, e.g. a brace construction, whereby braces are formed of metal and carry regions of insulating material which serve the purpose of fixing the contact pins 2.

Figure 2:
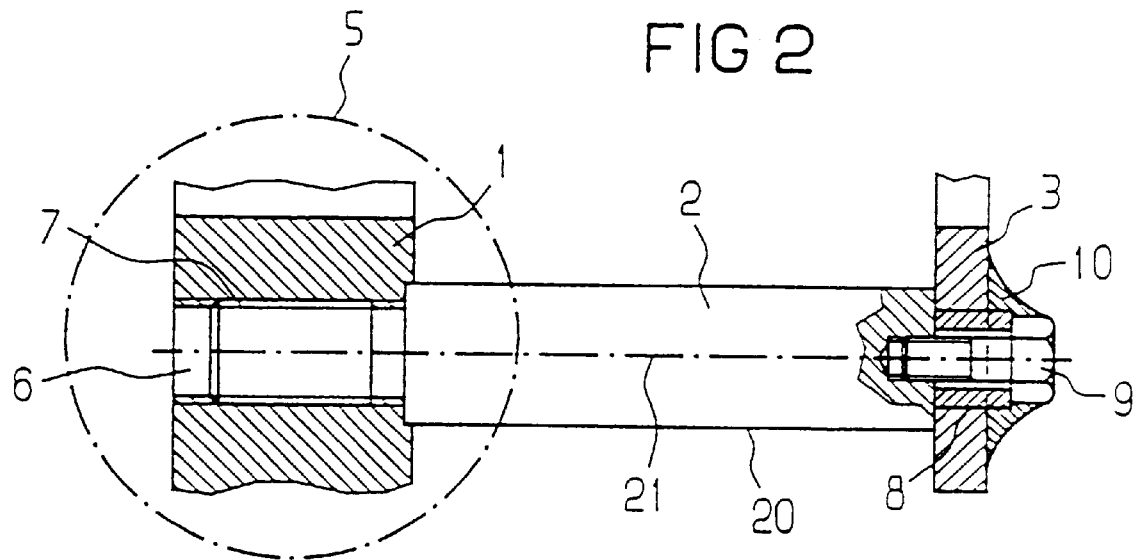
FIG. 2 is a fragmentary, partly broken-away and sectional view of a region of a supporting base with a contact pin fixed thereat and a welded fastening of a rigid distributor ring at another end of the pin.

An embodiment example of the mechanisms for fixing the contact pins 2 to the supporting base 1 as well as to a distributor ring 3, is illustrated in FIG. 2. The supporting base 1 is made of an insulating material in a region 5 of a connecting location to the contact pin 2. The supporting base 1 has a continuous hole 6 with an inner thread, in which an outer thread 7 at one end of the contact pin 2 is screwed. Another end of the contact pin 2 is inserted into a hole 8 in a distributor ring 3. During assembly of the distributor ring 3, the connection to the contact pin 2 is first secured by a fastening part 9, e.g. a screw, and subsequently welded at a front surface. Accordingly, a welding seam 10 lies at the end of the contact pin. The embodiment example contains a mainly cylindrical contact pin 2 with a longitudinal axis 21 and an outer contact surface 20.

Figure 3:
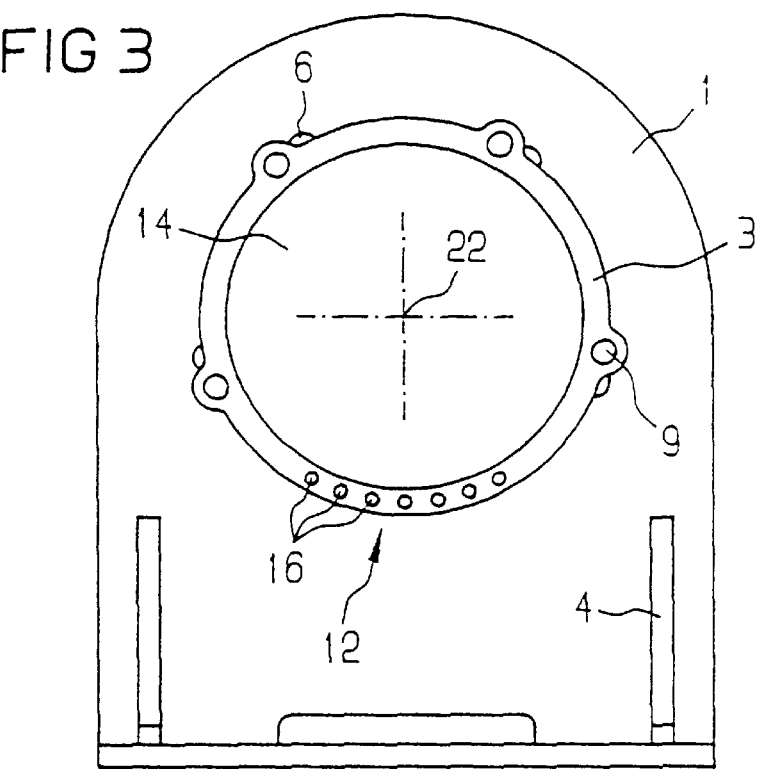
FIG. 3 is a front-elevational view of a supporting base with a current distributor along with a distributor ring fixed on thereto.
Figure 4:
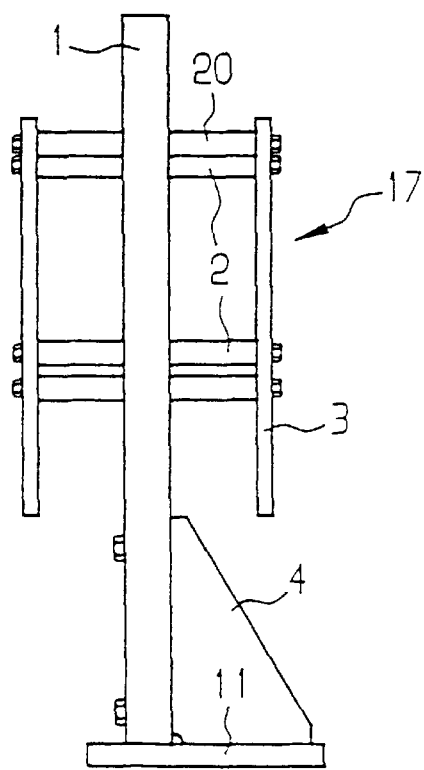
FIG. 4 is a side-elevational view of a supporting base with two current distributors fixed thereto, in a predominantly mirror-symmetric configuration relative to the supporting base.

FIG. 3 clearly illustrates that for both of the current distributors 17 of the embodiment example shown in FIG. 1, the same components can be used. The fixing points of the contact pins 2 are staggered relative to one another. However, both of the distributor rings 17 are constructed in the same manner, as one can see from the positions of the fixing parts 9 and the holes 6 in the supporting base. The same situation can also be seen from the side view of the embodiment example illustrated in FIG. 4.

Figure 5:
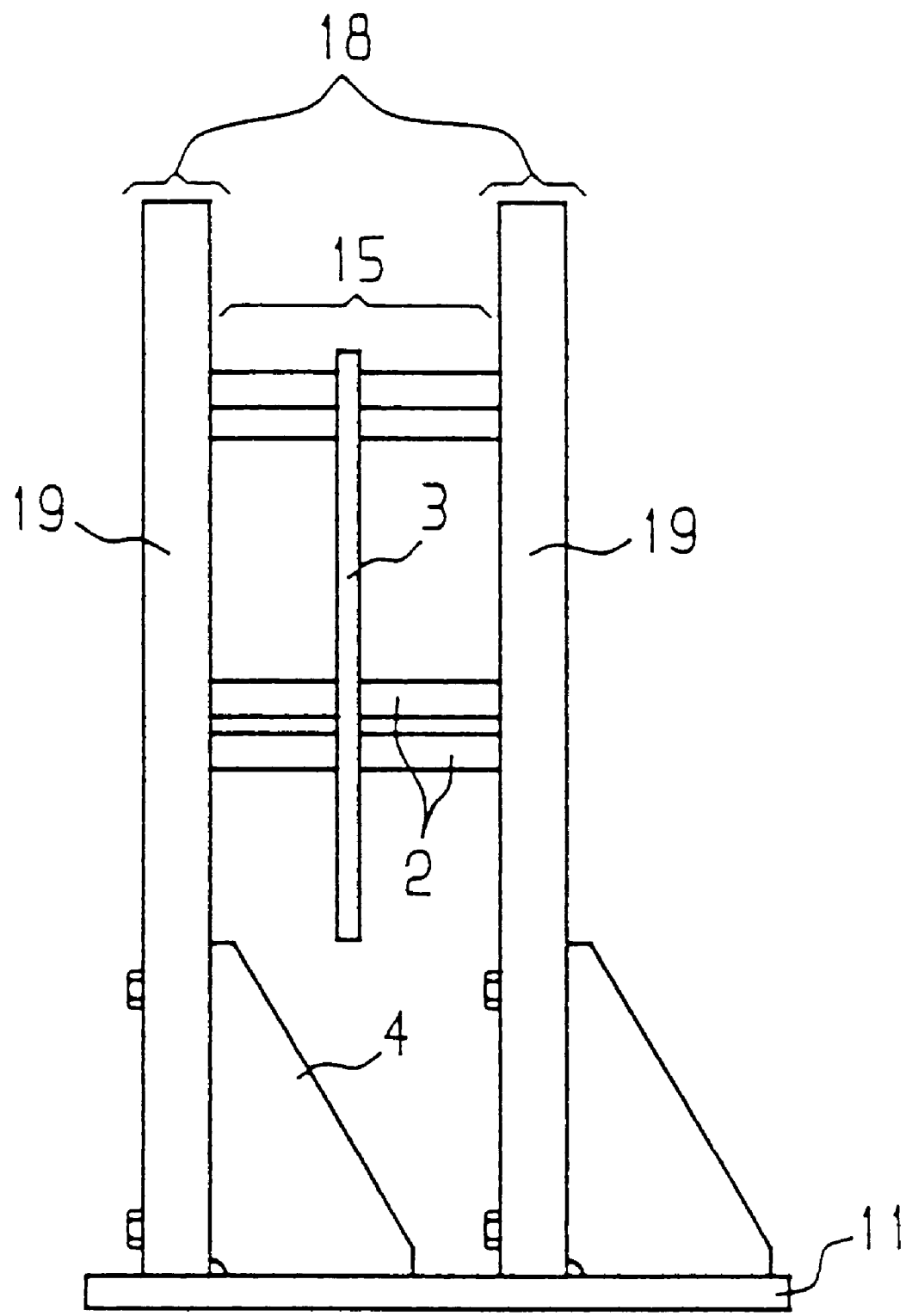
FIG. 5 is a side-elevational view of a supporting base with two base parts, between which a current distributor is disposed.

FIG. 5 shows a second embodiment example of the device according to the invention. A current distributor 15 is disposed between two base parts 19 of a divided supporting base 18. Both of the base parts 19 are supported by supporting legs 4 and are fixed to the same base plate 11. The current distributor 15 has a distributor ring 3 which is disposed in the center between the two base parts 19 and is connected to all of the contact pins 2.

Figure 6:
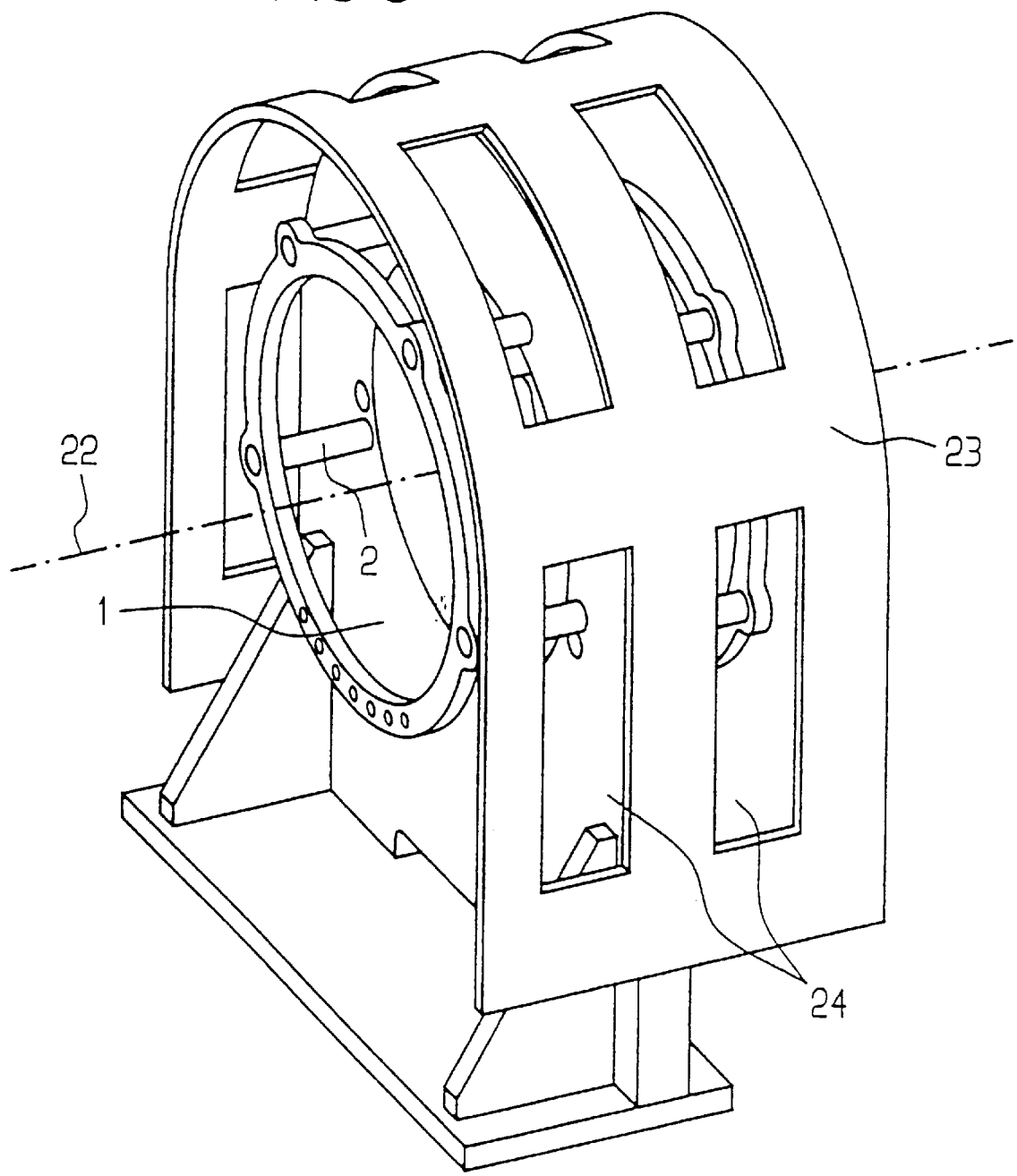
FIG. 6 is a perspective view of an embodiment example with a contact-protection hood according to the invention.

FIG. 6 show s a device according to the invention with a contact-protection hood 23 which is fastened to the supporting base 1 and has longitudinal window-like openings 24. The contact-protection hood 23 surrounds the current distributors 17 at the top and at s ides lying horizontally transverse to the rotation axis 22 of a shaft. The contact-protection hood 23 is open-at both ends, in the direction of the rotation axis, so that air can flow there horizontally below the contact-protection hood.

Figure 7:
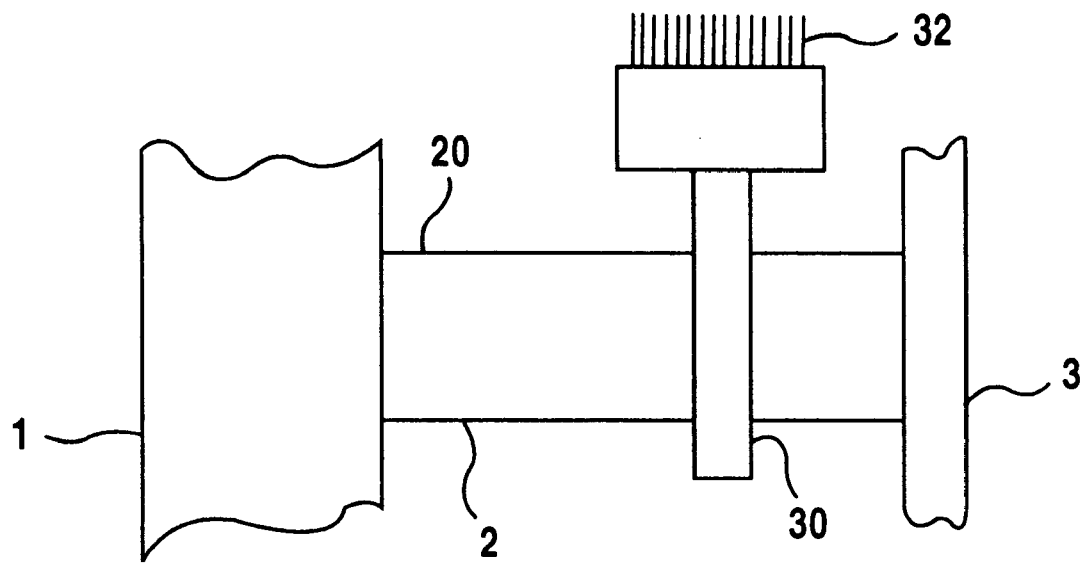
FIG. 7 shows a brush connected to a pin.

FIG. 7 shows a prior art brush holder 30 and a brush 32. The brush holder 30 has been inserted onto a contact pin 2 so that the contact pin 2 supports the brush 30 and so that the outer contact surface 20 of the contact pin 2 is electrically connected with the brush 32.

It is possible to construct a device for any possible number of brushes and brush configuration by using a combination of the two structures of the device according to the invention, as show n in the embodiment examples, and retaining the structural principle. The structural principle is thus universally applicable for current generators and electrical motors with a shaft.

We claim:

1. A device for supporting and electrically contacting brushes and for establishing an electrical loop contact with slip-rings on a shaft of a current generator or an electrical motor, the device comprising;

a supporting base having connection regions;

a plurality of pins fastened to said supporting base at said connection regions for supportively connecting a plurality of brushes to said supporting base;

at least one current distributor to be electrically contacted to at least two of the plurality of brushes and to be connected to at least one electrical connection line;

at least some of said plurality of pins being component parts of said at least one current distributor and being electric contact pins with contact surfaces, for supportively connecting and electrically contacting at least some of the plurality of brushes; and said supporting base including electrically insulating material at least at said connection regions.

2. The device according to claim 1, wherein said current distributor has a rigid distributor ring mutually connecting, stabilizing and short-circuiting at least some of said contact pins.

3. The device according to claim 1, wherein at least two of said contact pins are connected to said at least one current distributor by welding seams.

4. The device according to claim 1, wherein said at least one current distributor has a perforated connecting terminal for fixing the at least one electrical connection line, and the connecting terminal is tin-plated.

5. The device according to claim 1, wherein said at least one current distributor has a perforated connecting terminal for fixing the at least one electrical connection line, and said contact surfaces of said more than one contact pin of said current distributor are tin-plated.

6. The device according to claim 1, wherein said at least one current distributor has a perforated connecting terminal for fixing the at least one electrical connection line, and the connecting terminal and said contact surfaces of said more than one contact pin of said current distributor are tin-plated.

7. The device according to claim 1, wherein said supporting base has a supporting wall with a cutout for the shaft with the slip-rings.

8. The device according to claim 1, wherein said contact pins have longitudinal axes aligned parallel to a rotation axis of the shaft.

9. The device according to claim 8, wherein said longitudinal axes all lie at approximately the same distance from the rotation axis of the shaft.

10. The device according to claim 1, wherein said supporting base has threaded holes formed therein, and said contact pins each have an end with an outer thread screwed into a respective one of said threaded holes.

11. The device according to claim 1, wherein said supporting base has two opposite outer sides, said at least one current distributor is two current distributors having contact pins, said current distributors are electrically insulated from one another by said connection regions of said base, said current distributors are fixed to said two opposite outer sides of said supporting base, and said current distributors have outer sides approximately oriented in two opposite directions of a rotation axis of the shaft.

12. The device according to claim 11, wherein said contact pins have mutually staggered fixing locations, and said current distributors are substantially mirror-symmetrical to said supporting base, except for said fixing locations of said contact pins.

13. The device according to claim 11, including a contact-protection hood connected to said supporting base, said contact-protection hood surrounding the shaft and said two current distributors at the top and at sides lying horizontally transverse to the rotation axis of the shaft, and said contact-protection hood having two open ends in the direction of the rotation axis, permitting air to flow through said open ends and below said contact-protection hood.

14. The device according to claim 13, wherein said contact-protection hood has a plurality of window-like openings at the top and on both sides horizontally transverse to the rotation axis of the shaft, and said openings have a size dimensioned for limiting or preventing penetration to said current distributors but permitting a natural convection movement of air through said openings due to heat generation on the brushes.

15. The device according to claim 1, wherein said supporting base has a base part, said at least one current distributor is two current distributors having contact pins, said current distributors are electrically insulated from one another in said regions of said connecting locations to said contact pins due to said electrical insulation of said supporting base, said current distributors are fixed on said base part, and said current distributors have outer sides approximately oriented in two opposite directions of a rotation axis of the shaft.

16. The device according to claim 15, wherein said contact pins have mutually staggered fixing locations, and said current distributors are substantially mirror-symmetrical to said base part, except for said fixing locations of said contact pins.

17. The device according to claim 15, including a contact-protection hood connected to said supporting base, said contact-protection hood surrounding the shaft and said two current distributors at the top and at sides lying horizontally transverse to the rotation axis of the shaft, and said contact-protection hood having two open ends in the direction of the rotation axis, permitting air to flow through said open ends and below said contact-protection hood.

18. The device according to claim 17, wherein said contact-protection hood has a plurality of window-like openings at the top and on both sides horizontally transverse to the rotation axis of the shaft, and said openings have a size dimensioned for limiting or preventing penetration to said current distributors but permitting a natural convection movement of air through said openings due to heat generation on the brushes.

19. The device according to claim 1, wherein said supporting base is divided into two base parts, said current distributor having said contact pins is disposed between said two base parts, and said contact pins are fixed partly onto one of said base parts and partly onto the other of said base parts.

* * * * *